United States Patent [19]

Dye

[11] Patent Number: 5,478,119
[45] Date of Patent: Dec. 26, 1995

[54] POLARIZED MANIFOLD CONNECTION DEVICE

[75] Inventor: John F. Dye, Bridgewater, Mass.

[73] Assignee: The Kendall Company, Mansfield, Mass.

[21] Appl. No.: 205,445

[22] Filed: Mar. 4, 1994

Related U.S. Application Data

[63] Continuation-in-part of Ser. No. 12,990, Sep. 16, 1993, and Ser. No. 13,025, Sep. 16, 1993.

[51] Int. Cl.⁶ ............................................. F16L 35/00
[52] U.S. Cl. ...................... 285/26; 285/914; 285/921; 285/137.1; 604/283; 601/152
[58] Field of Search .............................. 285/26, 137.1, 285/921, 914; 604/283; 601/148, 149, 150, 151, 152

[56] References Cited

U.S. PATENT DOCUMENTS

| | | | |
|---|---|---|---|
| D. 327,738 | 7/1992 | Dye | D24/129 |
| D. 328,346 | 7/1992 | Dye | D24/129 |
| D. 330,250 | 10/1992 | Dye | D24/129 |
| D. 330,251 | 10/1992 | Dye | D24/129 |
| 3,469,863 | 9/1969 | Riester et al. | 285/137.1 |
| 4,013,069 | 3/1977 | Hasty | 128/24 R |
| 4,029,087 | 6/1977 | Dye et al. | 128/24 R |
| 4,030,488 | 6/1977 | Hasty | 128/24 R |
| 4,091,804 | 5/1978 | Hasty | 128/24 R |
| 4,150,673 | 4/1979 | Watt | 285/914 X |
| 4,156,425 | 5/1979 | Arkans | 128/24 R |
| 4,198,961 | 4/1980 | Arkans | 128/24 R |
| 4,202,325 | 5/1980 | Villari et al. | 128/24 R |
| 4,207,875 | 6/1980 | Arkans | 128/24 R |
| 4,207,876 | 6/1980 | Annis | 128/24 R |
| 4,253,449 | 3/1981 | Arkans et al. | 128/24 R |
| 4,280,485 | 7/1981 | Arkans | 128/24 R |
| 4,320,746 | 3/1982 | Arkans et al. | 128/24 R |
| 4,331,133 | 5/1982 | Arkans | 128/87 R |
| 4,372,297 | 2/1983 | Perlin | 128/64 |
| 4,375,217 | 3/1983 | Arkans | 128/24 R |
| 4,396,010 | 8/1983 | Arkans | 128/24 R |
| 4,402,312 | 9/1983 | Villari et al. | 128/24 R |
| 4,481,937 | 11/1984 | Arkans | 128/24 R |
| 4,574,812 | 3/1986 | Arkans | 128/691 |
| 4,630,847 | 12/1986 | Blenkush | 285/29 |
| 4,793,328 | 12/1988 | Kolstedt et al. | 128/24 R |
| 4,804,208 | 2/1989 | Dye | 285/26 |
| 4,827,912 | 5/1989 | Carrington et al. | 128/24 R |
| 4,858,596 | 8/1989 | Kolstedt et al. | 128/24 R |
| 4,938,208 | 7/1990 | Dye | 128/87 R |
| 4,945,905 | 8/1990 | Dye et al. | 128/24 R |
| 4,950,255 | 8/1990 | Brown et al. | 604/283 X |
| 4,966,396 | 10/1990 | Dye | 285/136 |
| 4,971,044 | 11/1990 | Dye | 128/87 R |
| 5,007,411 | 4/1991 | Dye | 128/64 |
| 5,022,387 | 6/1991 | Hasty | 128/64 |
| 5,031,604 | 7/1991 | Dye | 128/64 |
| 5,117,812 | 6/1992 | McWhorter | 128/24 R |
| 5,186,163 | 2/1993 | Dye | 128/64 |
| 5,219,185 | 6/1993 | Oddenino | 285/26 |
| 5,246,380 | 9/1993 | Kodama | 285/921 |

*Primary Examiner*—Terry Lee Melius
*Assistant Examiner*—Heather Chun Shackelford
*Attorney, Agent, or Firm*—David J. Koris; Alvin Isaacs

[57] ABSTRACT

A polarized manifold connection device for connecting multiple conduits from a compression sleeve having inflatable chambers to multiple tubing from a source of pressurized fluid is disclosed. The connection device comprises a male connector half and a female connector half each having a similar visually perceptible asymmetrical configuration of their respective housings defined by rigid elements which resist deformation of the housings. Thus, the two halves can be connected in only a single orientation. In this manner, the conduits from the source of fluid are uniquely connected to the conduits from the inflatable chambers. The connection device incorporates a releasable locking mechanism which allows the connector halves to be connected by pushing them together and disconnected by pulling them apart without excessive force. A gasket is provided between the connector halves having a configuration which provides an air-tight seal between the connector halves, but allows connection and disconnection of the halves without excessive force. The connection device is also able to connect to other types of polarized connection devices.

18 Claims, 6 Drawing Sheets

POLARIZED MANIFOLD CONNECTION DEVICE

RELATED APPLICATIONS

This application is a continuation-in-part of copending U.S. design patent application number 29/012,990, entitled Connector For Device For Applying Compressive Pressure to the Leg, filed on Sept. 16, 1993, and of copending U.S. design patent application number 29/013,025, entitled Connector For Device For Applying Compressive Pressure to the Leg, filed on Sept. 16, 1993, by John F. Dye, the present inventor.

FIELD OF THE INVENTION

This invention relates to fluid line connection devices and more particularly to devices for connecting multiple fluid conduits for use with compression devices to improve circulation in the limbs of patients.

BACKGROUND OF THE INVENTION

Compression devices are used to improve circulation and prevent the formation of thrombi in the limbs of patients. These devices typically include a compression sleeve or garment which wraps around the patient's limb. The sleeve has a plurality of separate inflatable chambers which are connected via conduit lines to a source of compressed fluid, generally air. The chambers are sequentially inflated to provide a compressive pulse to the limb, thereby increasing blood circulation and minimizing the formation of thrombi. The compression pulses begin around the portion of the limb farthest from the heart and progress sequentially toward the heart. For example, for a three-chambered leg sleeve, the ankle chamber is inflated first, followed by the calf chamber, and then the thigh chamber. Typical compression devices are described in U.S. Pat. Nos. 4,013,069 and 4,030,488, incorporated herein by reference.

The compression sleeves are in fluid communication with the compressed air source via a plurality of conduits. A separate conduit is provided between the compressed air source and each chamber of the sleeve, so that the inflation of each chamber may be separately controlled. An additional conduit is also generally provided as a cooling line. Thus, for a three-chambered sleeve, four tubes may interconnect each sleeve and the compressed air source.

Typically, a manifold connector is provided in the conduit lines to facilitate the connection between the sleeve and the compressed air source. For example, since the sleeves are generally disposable for sanitary and health reasons, a connector in the conduit lines allows a used sleeve to be disconnected and a new sleeve to be subsequently connected to a single compressed air source. Since the chambers of each sleeve must be inflated in a particular order, the multiple conduits between the sleeve and the source must be properly oriented at the connector to ensure proper operation of the device. Typical connectors for use with compression devices are shown in U.S. Pat. Nos. 4,253,449 and 4,804,208, incorporated herein by reference.

SUMMARY OF THE INVENTION

The present invention provides an airtight, polarized connection device for interconnecting multiple conduits from a compression sleeve to multiple conduits from a compressed air source or controller affording certain significant advantages to be discussed in detail hereinafter. The connection device comprises a male connector half and a female connector half. The mating housings of each half have a similar visually perceptible asymmetrical configuration defined by asymmetrically located rigid elements which resist deformation of the housings. This configuration ensures that the two halves mate in only a single orientation and minimizes the likelihood that a user could force the two halves together in the wrong orientation.

A releasable locking mechanism allows the connector halves to be connected by pushing them firmly together and disconnected by pulling them firmly apart. The releasable locking mechanism has resilient fingers formed in the walls of the male connector half. Each finger has a tab on the end. Corresponding openings to receive the tabs are formed in the walls of the female connector half. Angled walls on the tabs allow the tabs to be readily inserted into the opening to connect the two connector halves and disengaged from the opening to disconnect the two connector halves.

A gasket is provided to ensure an air-tight seal between the connector halves, but also allow connection and disconnection of the halves without excessive force. The gasket is formed as a unitary member having a plurality of conduits sized to fit over corresponding ports within the male and female housings. The gasket is fixedly attached at one end to the ports in one housing. At the other end, the conduit walls of the gasket are formed more thinly and are thereby sufficiently flexible to allow the ports of the other housing to slide in and out of the conduits without excessive force. An O-ring is formed within the thinner walls of each flexible conduit to provide a seal around the ports in the other housing.

Prior connectors employed upraised keys and recessed keyways asymmetrically placed to ensure that the two parts could mate in only a single orientation. The present invention may incorporate the prior art recessed keyways if desired, allowing one part of the present connector to mate with a corresponding part of a prior art connector.

DESCRIPTION OF THE DRAWINGS

The invention will be more fully understood from the following detailed description taken in conjunction with the accompanying drawings in which.

DETAILED DESCRIPTION OF THE INVENTION

A polarized manifold connection device 10 according to the present invention for interconnecting multiple conduits from a compression sleeve to multiple tubing from a compressed air source or controller is shown in FIGS. 1 through 19. A polarized connector is one having parts which interconnect in a particular or singular orientation. The manifold connection device 10 comprises a first or male connector half 12 and a second or female connector half 14. The first or male connector half 12 is connected via a plurality of fluid conduits 16a, 16b, 16c, 16d, to a compression sleeve 20. The second or female connector half 14 is in fluid communication via a plurality of fluid conduits 18a, 18b, 18c, 18d, to a source of compressed air (not shown).

Referring to FIGS. 6 through 11, the male connector half 12 has a fence 22 proximally located relative to the compression sleeve 20 to surround and protect the terminations of the fluid conduits 16a, 16b, 16c, 16d. The male connector half also has a housing 24 distally located relative to the compression sleeve. The fence 22 and housing 24 are separated by a bulkhead 26 which may include an extension 27 which extends peripherally beyond the fence and housing. The housing 24 has a visually perceptible asymmetrical configuration. As shown in FIGS. 6 through 11, the housing comprises a pair of generally opposed top and bottom walls 30, 32. The top and bottom walls are interconnected by a pair of generally opposed sidewalls 34, 36 which are shorter than the top and bottom walls. The sidewalls 34, 36 and the top wall 30 are joined at rounded outer edges 38, 40 such that the sidewalls 34, 36 and top wall 30 provide a generally U-shaped configuration in cross section. The sidewalls 34, 36 and the bottom wall 32 are joined at generally sharper outer edges 42, 44. The sidewalls 34, 36 are additionally formed with a slight outward taper from the top wall 30 to the bottom wall 32. The rounded edges and slight taper impart a readily visually perceptible, asymmetrical configuration to the housing.

Figure 11:
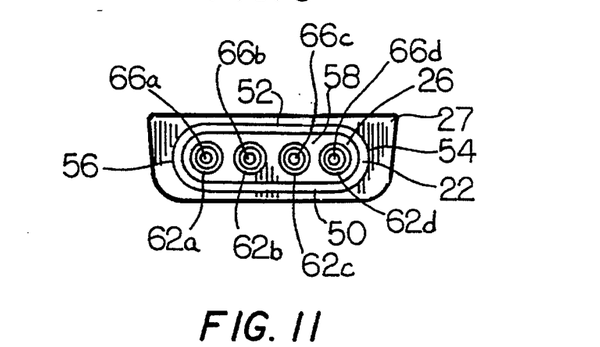
FIG. 11 is a rear elevational view of the male connector half of FIG. 6.
Figure 12:
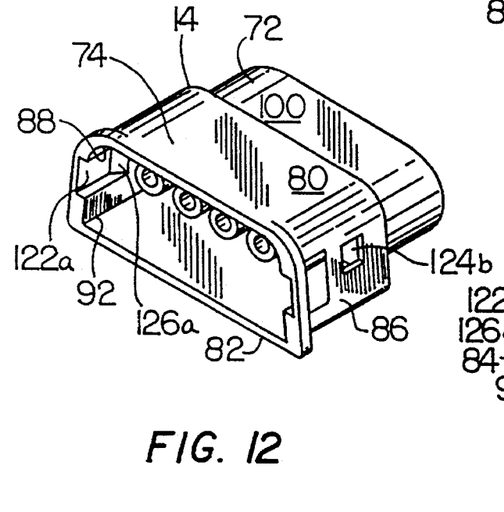
FIG. 12 is a perspective view of the female connector half of the present invention.
Figure 13:
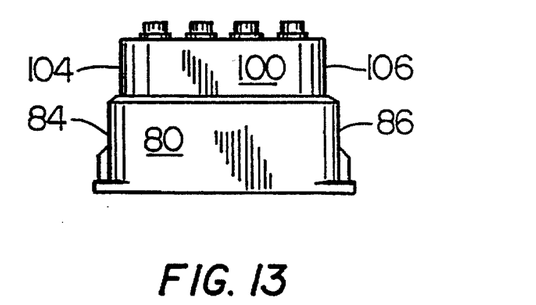
FIG. 13 is a top plan view of the female connector half of FIG. 12.
Figure 14:
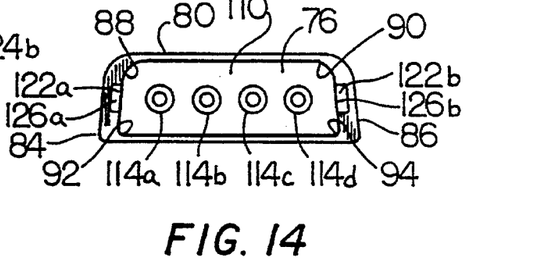
FIG. 14 is a front elevational view of the female connector half of FIG. 12.
Figure 15:
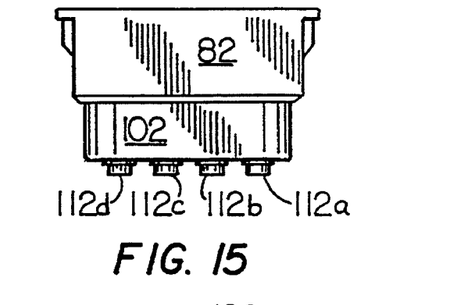
FIG. 15 is a bottom plan view of the female connector half of FIG. 12.
Figure 16:
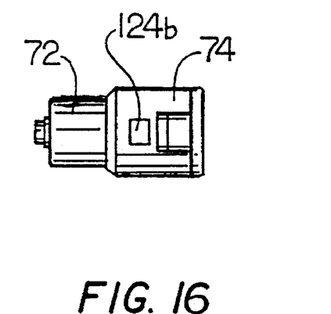
FIG. 16 is a side elevational view of the female connector half of FIG. 12.

The fence 22 of the male connector half 12 similarly comprises a top wall 50 and a bottom wall 52 disposed in general opposition to the top wall 50. The top and bottom walls are interconnected by a pair of generally opposed sidewalls 54, 56 which may have a rounded configuration as shown in FIG. 11.

Within the recess 58 defined by the fence 22, a plurality of fluid ports 62a, 62b, 62c, 62d are arrayed. The fluid conduits 16a, 16b, 16c, 16d from the compression sleeve 20 fit tightly over the fluid ports 62a, 62b, 62c, 62d in the proximal housing 22. The ports extend slightly beyond the fence 22, rendering them visually perceptible, thereby aiding in placing the conduits over the ports during assembly. The conduits are preferably fixedly attached to the ports by any suitable method, such as solvent bonding. The conduits 16a, 16b, 16c, 16d fit snugly within the top and bottom walls 50, 52 and rounded sidewalls 54, 56 of the fence. In this manner, the fence protects the terminations of the conduits and prevents the conduits from applying excessive pressure on the ports due to bending of the conduits.

Within the recess 60 defined by the housing 24, a plurality of fluid ports 64a, 64b, 64c, 64d are arrayed in alignment with the ports 62a, 62b, 62c, 62d in the fence 22. Openings 66a, 66b, 66c, 66d in the bulkhead 26 interconnect the ports 62a, 62b, 62c, 62d in the fence 22 with the ports 64a, 64b, 64c, 64d in the housing 24.

Referring to FIGS. 12 through 17, the second or female connector half 14 comprises a fence 72 proximally located relative to the source of compressed air to surround and protect the terminations of the fluid conduits 18a, 18b, 18c, 18d. The female connector half also has a housing 74 distally located relative to the source of compressed air. The fence 72 and housing 74 are separated by a bulkhead 76. The housing 74 comprises a top wall 80 and a bottom wall 82 disposed in general opposition to the top wall. The top and bottom walls are interconnected by a pair of generally opposed sidewalls 84, 86 which are shorter than the top and bottom walls. The sidewalls and top wall are joined at rounded inner edges 88, 90 such that the sidewalls 84, 86 and top wall 80 provide a generally U-shaped configuration in cross section. The sidewalls 84, 86 and the bottom wall 82 are joined at generally sharper inner edges 92, 94. The sidewalls 84, 86 are additionally formed with a slight outward taper from the top wall 80 to the bottom wall 82 if desired. The rounded edges and slight taper impart a readily visually perceptible asymmetrical configuration to the housing 74 which is matingly compatible with the asymmetrical configuration of the housing 24 of the male connector half 12.

The housing 74 of the female connector half 14 is sized relative to the housing 24 of the male connector half 12 such that the housing 24 of the male connector half 12 fits snugly within the housing 74 of the female connector half 14. The asymmetrical configuration of the mating housings ensures that the housings couple in only one orientation. Also, the asymmetrical configurations are readily visually perceptible, ensuring that a user does not attempt to force the mating housings to fit the wrong way. Toward this end, the shape of the outer periphery of the bulkhead extension 27 may be similar to the shape of the outer surface of the housing 24 of the male connector half 12, to aid in enhancing the visual distinction of the asymmetrical configuration.

Prior art manifold connectors include a plurality of interconnecting upraised keys on the female connector and recessed keyways on the male manifold connector. The keys and keyways are disposed in an asymmetrical configuration such that the keys must be aligned with their respective keyways to permit the connector halves to be connected. In the present invention, the male connector half 12 includes a plurality of keyways 142a, 142b, 142c, 142d, 142e configured to align with corresponding keys on a female connector half of prior art manifold connectors. In this manner, the male connector half of the present invention can also be used with prior art female connector halves. This is particularly advantageous in that the male connector half is typically connected to the conduits 16a, 16b, 16c, 16d from the compression sleeve 20, while the female connector half is typically connected to the conduits from the compressed air source. Thus, the prior compressed air source can continue to be used with new compression sleeves which incorporate the male connector of the present invention.

In addition, prior art manifold connectors have rectangular symmetrical housings. The longer top and bottom walls of such housings are typically somewhat flexible, and even with the presence of keys and keyways, users could flex the walls sufficiently to force the connector halves together in the wrong orientation. The asymmetrical corners of the housings of the present invention are stronger and more difficult to flex than the longer top and bottom walls and hinder a user from forcing the connector halves together in the wrong orientation. Also, the shorter side walls are more difficult to flex than the longer walls. The angle or taper imparted to the shorter sidewalls also provides an asymmetry which hinders a user from forcing the connector halves together in the wrong orientation.

Figure 17:
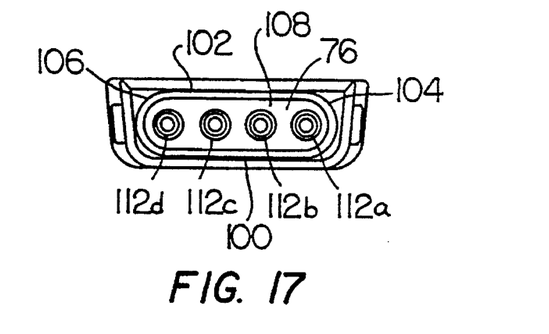
FIG. 17 is a rear elevational view of the female connector half of FIG. 12.

As with the male connector half, the fence 72 of the female connector half 14 also comprises a top wall 100 and a bottom wall 102 disposed in general opposition to the top wall 100. The top and bottom walls are interconnected by a pair of generally opposed sidewalls 104, 106 which may have a rounded configuration as shown in FIG. 17.

Within the recess 108 defined by the fence 72, a plurality of fluid ports 112a, 112b, 112c, 112d are arrayed. The fluid conduits 18a, 18b, 18c, 18d from the compressed air source fit tightly over the fluid ports 112a, 112b, 112c, 112d in the fence 72. The ports extend slightly beyond the fence 72, rendering them visually perceptible, thereby aiding in placing the conduits over the ports during assembly. The conduits are preferably fixedly attached to the ports by any suitable method, such as solvent bonding. The conduits 18a, 18b, 18c, 18d fit snugly within the top and bottom walls 100, 102 and rounded sidewalls 104, 106 of the fence 72. In this manner, the fence protects the terminations of the conduits 18a, 18b, 18c, 18d and prevents the conduits from applying excessive pressure on the ports due to bending of the conduits.

Within the recess 110 defined by the housing 74, a plurality of fluid ports 114a, 114b, 114c, 114d are arrayed in alignment with the ports 112a, 112b, 112c, 112d in the fence 72. Openings in the bulkhead 76 interconnect the ports 112a, 112b, 112c, 112d in the fence 72 with the ports 114a, 114b, 114c, 114d in the housing 74.

Figure 18:
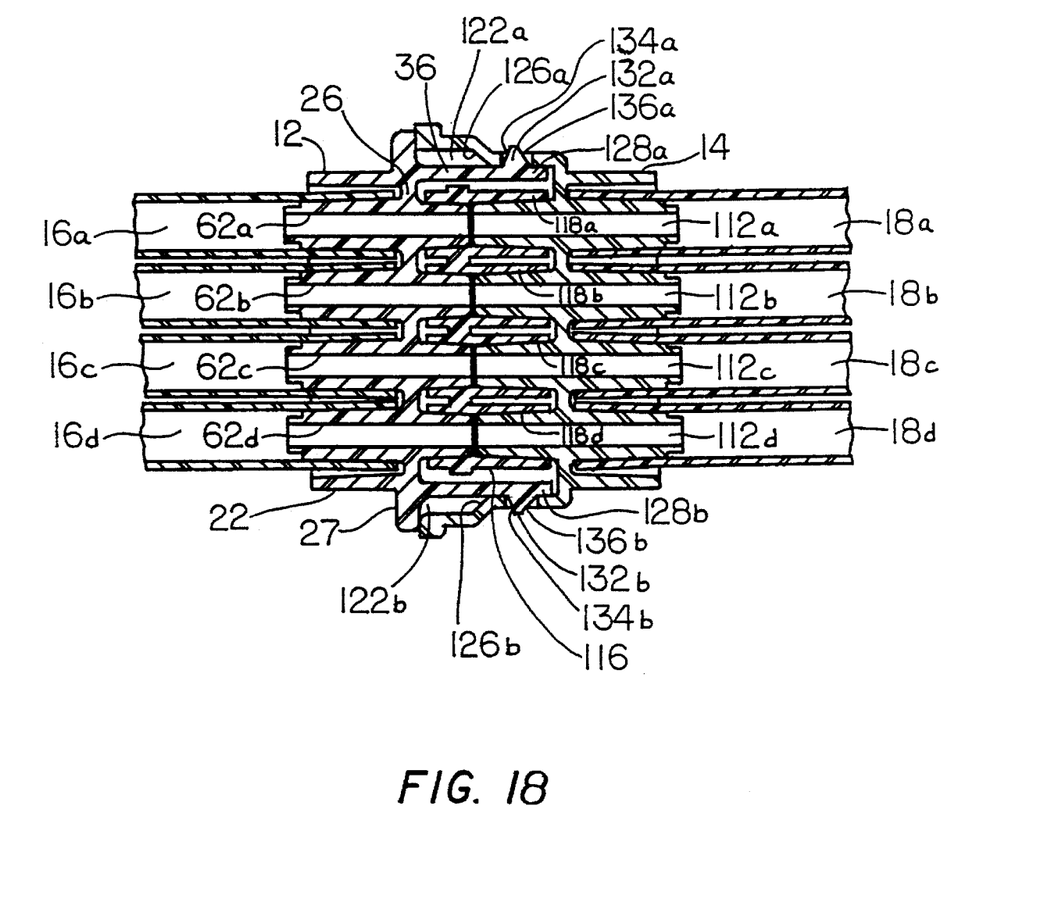
FIG. 18 is cross-sectional view of the manifold connector of the present invention.

The fluid ports 64a, 64b, 64c, 64d within the housing 24 of the male connector half 12 align and generally abut against the fluid ports 114a, 114b, 114c, 114d within the housing 74 of the female connector half 14. As seen in FIG. 18, a gasket 116 is disposed within the housing 24 of the male connector half 12 and the housing 74 of the female connector half 14 to align and sealingly interconnect the fluid ports of both halves for fluid passage therethrough over the operative pressure range of compression devices. The gasket comprises a plurality of short conduits 118a, 118b, 118c, 118d each of which overlies a respective port of the male connector half 12 and the female connector half 14.

Figure 19:
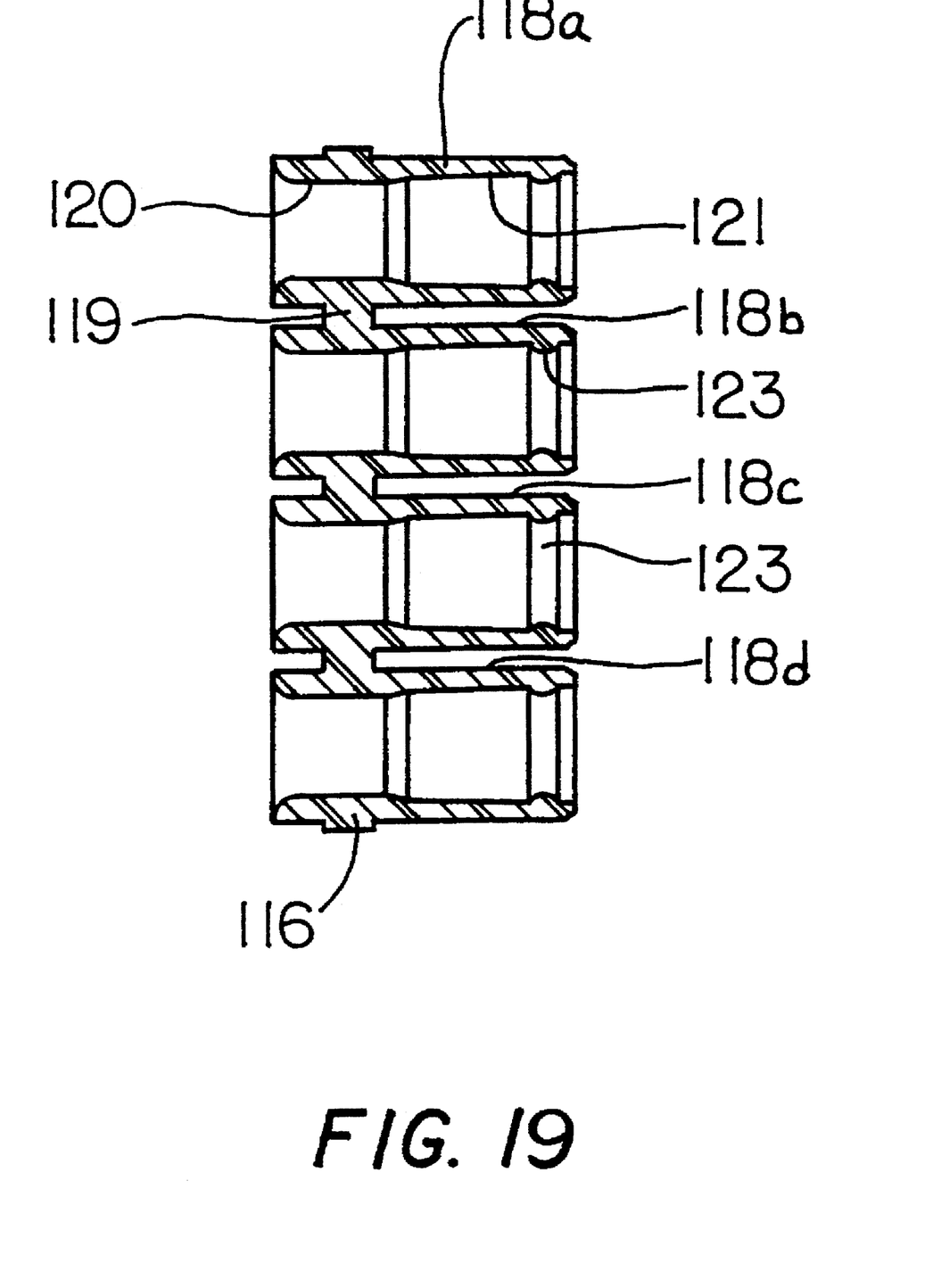
FIG. 19 is a cross-sectional view of a gasket according to the present invention.

As seen more particularly in FIG. 19, the conduits are connected by a web 119 to form a unitary member. Each conduit has a thicker wall section 120, extending from adjacent the web to one opening, and a thinner wall section 121 extending to the opposite opening. The thinner wall section may also taper slightly toward the opening if desired. An inwardly directed annular flange or O-ring 123 is provided near the opening within each thinner wall section 121 which forms the seal around the ports. Preferably, the O-ring is integrally formed with the gasket. The thicker wall sections may be fixedly attached, for example, by solvent bonding, to one set of fluid ports, such as those ports 64a, 64b, 64c, 64d within the housing 24 of the male connector half 12. To join the connector halves 12, 14, the fluid ports 114a, 114b, 114c, 114d in the female connector half 14 are pushed into the corresponding thinner wall sections 121 of the gasket. Being thinner and incorporating an O-ring, the wall sections 121 can distort sufficiently to allow the fluid ports to slide in and out without excessive friction, while still maintaining a seal. By reducing the friction between the gasket and ports, less force is required to connect and disconnect the ports. Preferably, the thickness of the thinner wall sections is chosen to allow the ports to be connected and disconnected with a force of approximately 2–3 lbs, whereas prior art connectors require a force of approximately 16 lbs. The O-ring 123 ensures a fluid-tight seal to prevent leakage.

A releasable locking mechanism is provided to connect and disconnect the male and female connector halves. The interior of the side walls 84, 86 of the housing 74 of the female connector half 14 each have a recess 122a, 122b formed therein. An opening 124a, 124b is disposed in each sidewall adjacent each recess 122a, 122b. Each recess includes an angled wall 126a, 126b. A locking finger 128a, 128b is resiliently formed in each sidewall 34, 36 of the housing 24 of the male connector half 12. An outwardly extending tab 132a, 132b on the end of each locking finger 128a, 128b is disposed thereon to mate with each opening 124a, 124b in the sidewall when the male and female connector halves are interconnected.

Figure 1:
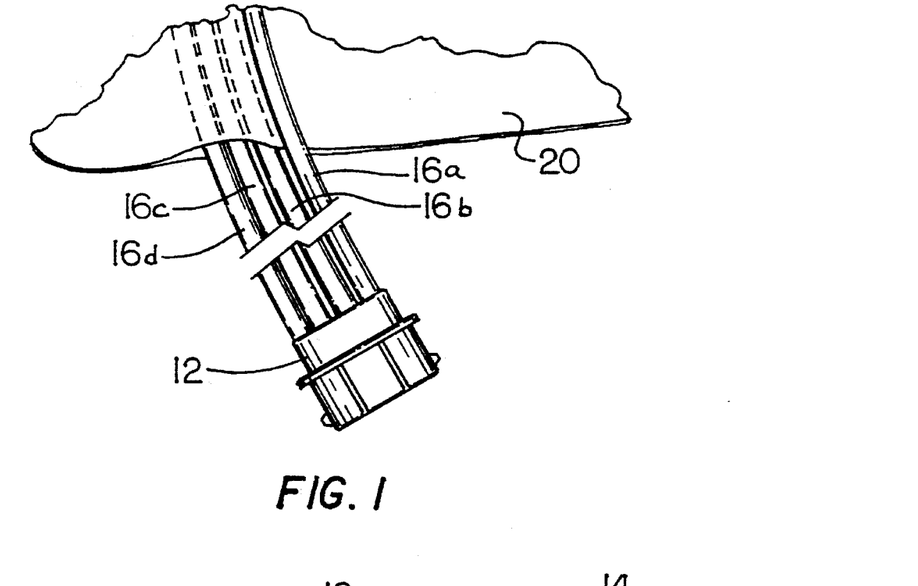
FIG. 1 is a plan view of a male connector half of the manifold connector attached to a compression sleeve of the present invention.
Figure 2:
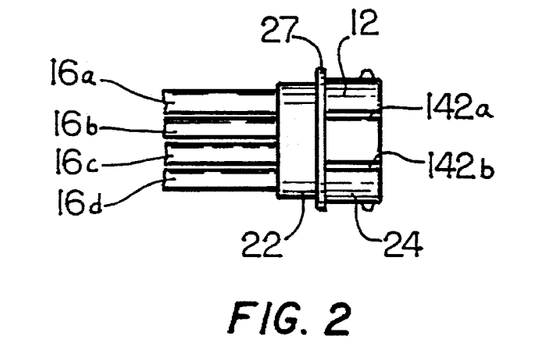
FIG. 2 is a plan view of the male connector half of FIG. 1.
Figure 3:
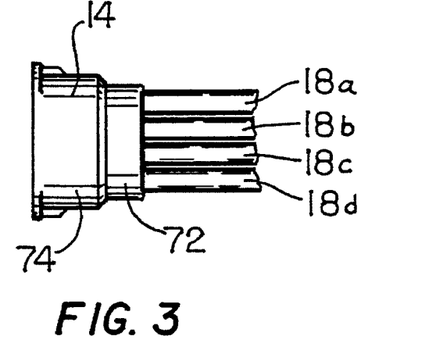
FIG. 3 is a plan view of a female connector half of the manifold connector of the present invention.
Figure 4:
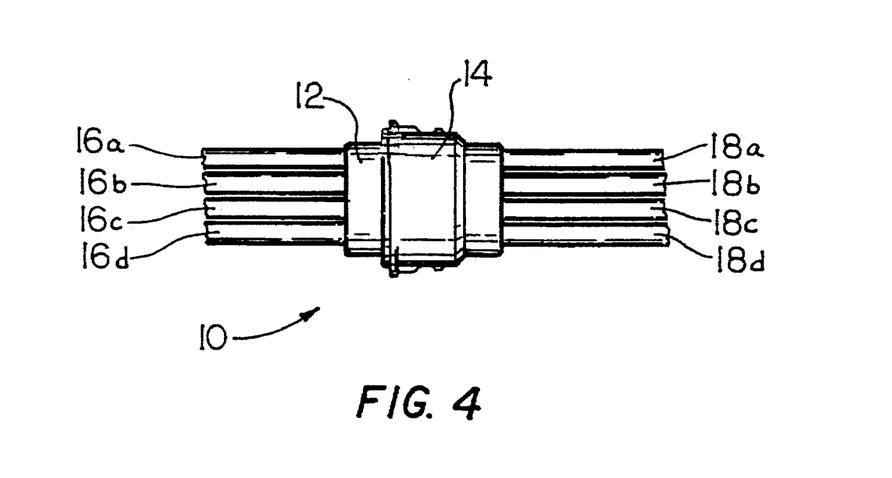
FIG. 4 is a plan view of the manifold connector of the present invention.
Figure 5:
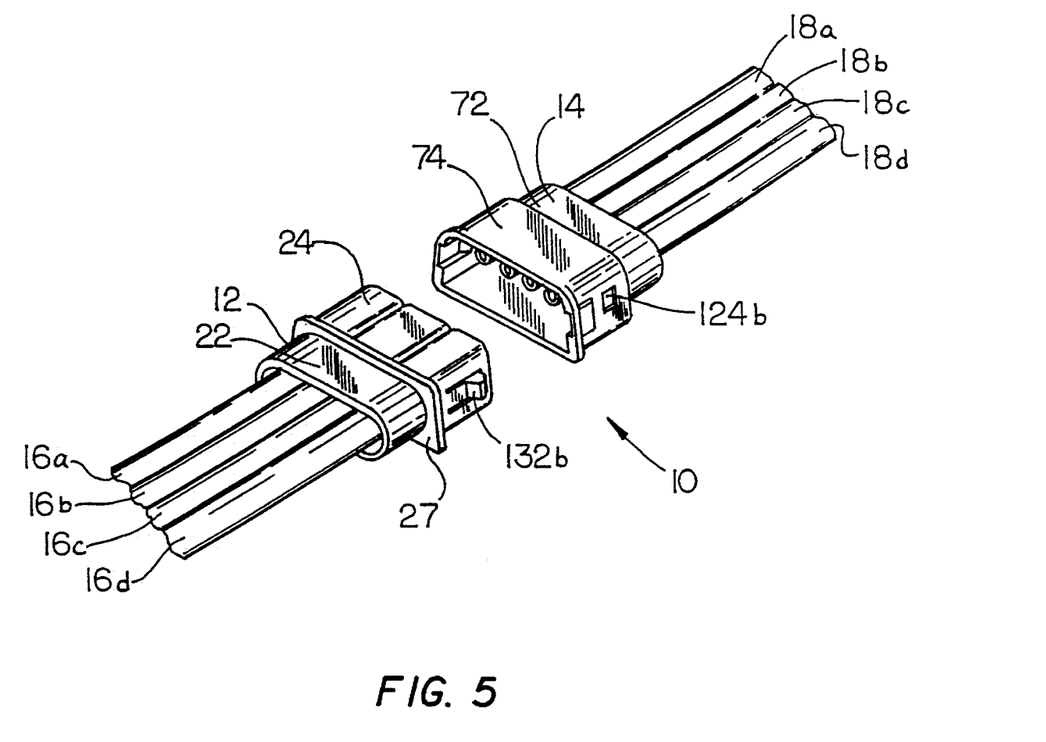
FIG. 5 is a perspective view of the manifold connector of the present invention.
Figure 6:
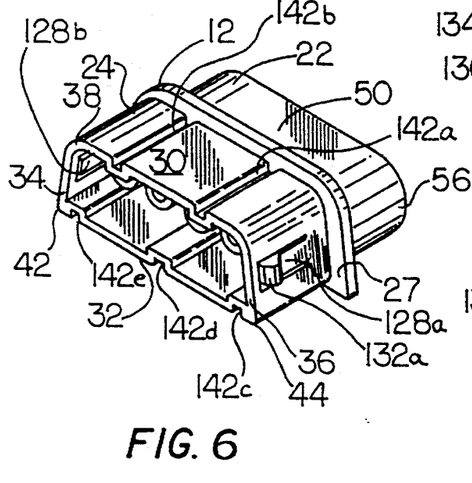
FIG. 6 is a perspective view of the male connector half of the present invention.
Figure 7:
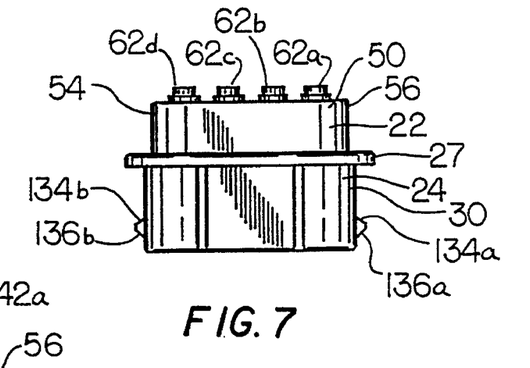
FIG. 7 is a top plan view of the male connector half of FIG. 6.
Figure 8:
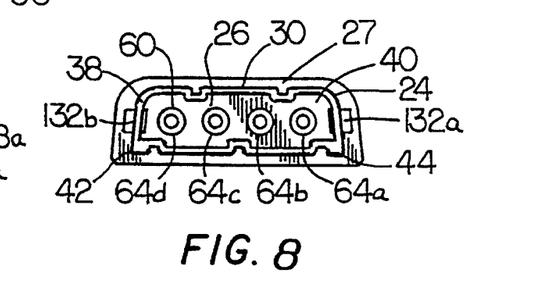
FIG. 8 is a front elevational view of the male connector half of FIG. 6.
Figure 9:
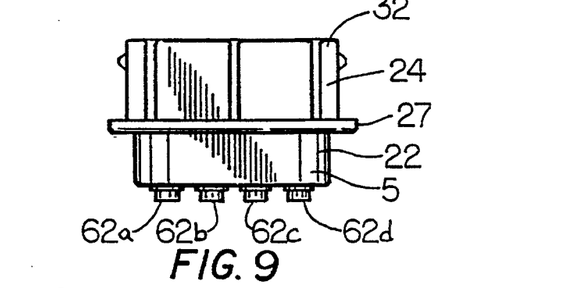
FIG. 9 is a bottom plan view of the male connector half of FIG. 6.

Each tab 132a, 132b is formed with angled walls 134a, 134b and 136a, 136b, best shown in FIG. 7, to facilitate insertion and removal. During insertion, the male and female connector halves are simply pushed firmly together, and the outer angled walls 136a, 136b of the tabs on the male connector half 12 ride up the angled walls 126a, 126b of the corresponding recesses 122a, 122b in the female connector half 14. The tabs 132a, 132b audibly snap into the openings 124a, 124b. The audible snap aids the user in knowing that the two halves are properly connected. During removal, the male and female connector halves are simply pulled firmly apart, and the inner angled walls 134a, 134b of the tabs 132a, 132b pressing against the side of the openings 124a, 124b force the resilient fingers 128a, 128b inward and allow the tabs 132a, 132b to be pulled out of the openings 124a, 124b. The amount of angle imparted to the angled walls 134a, 134b determines the amount of force required to remove the male connector half from the female connector half. The greater the angle from the axis of the finger is, the more force is required to pull the halves apart. It has been determined that an angle of about 60° from the axis of the finger requires about 10 lbs of force to remove the halves. With this amount of force, the male and female connector halves remain together in use, but may be readily disconnected by pulling firmly on each half. The halves can also be disconnected rapidly in the event of an emergency without any additional steps, such as pressing a release latch, which can hinder rapid disconnection.

Figure 10:
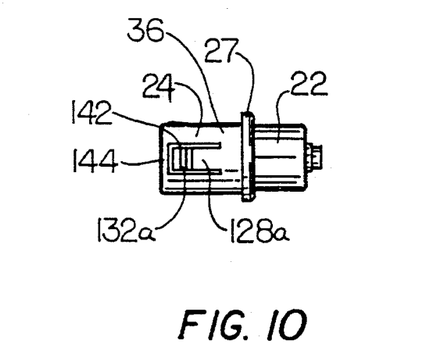
FIG. 10 is a side elevational view of the male connector half of FIG. 6.

As best seen in FIG. 10, each locking finger 128a, 128b is joined at its base to the respective sidewalls 34, 36 and is surrounded on its other sides by the sidewalls separated by a U-shaped space 142. In particular, a bridge or cross piece 144 interconnects the top and bottom sides of the sidewalls to form a more rigid wall. In this manner, the housing 24 is more rigid and less likely to deform by movement of the top and bottom walls 30, 32 toward each other.

In contrast, prior art connectors often employ a locking mechanism having a locking finger which is not fully surrounded by a unitary wall. With such a configuration, the longer walls of each half can be more readily squeezed toward each other, deforming the housing, sometimes to a degree sufficient to defeat the asymmetrical placement of the keys and keyways and force the halves together in the wrong orientation. The present invention alleviates this problem by providing a more rigid, unitary sidewall.

In addition, the locking finger of the present invention is more readily manufacturable. The tooling for molding each connector half has a metal piece which forms the space 142 surrounding the locking finger. In prior art connectors, the space between the walls on each side of the locking finger must be made as narrow as possible, to minimize deformation. The piece forming this space is thus small and tends to fail. In the present invention, the space 142 can be larger, since sidewall rigidity is improved by the presence of the bridge 144. Thus, the molding piece forming the space 142 is larger and less likely to fail.

The connector halves of the present invention are each molded as a single piece. Preferably, the exterior of the halves are formed with generally rounded outer edges. Also, the overall size of the connection device is preferably minimized. In this manner, the connection device is less likely to injure or irritate a patient if the patient lays on or rolls over the device in the bed.

Further, prior art connection devices typically employ connector halves which are identical, so that they can be used interchangeably. Accordingly, once assembled, one of the connector halves has a relatively large opening into which the conduits are inserted for connection. To protect the conduits and give the connection device a more finished look, this opening is closed with a third cap piece. Installing the third piece, however, adds another step to the assembly of the connection device. The present invention, which employs fences to surround and protect the conduits, eliminates the need for such a third cap piece. Also, the connection device can be made smaller, which minimizes material and reduces injury or irritation to the patient if the patient rolls or lays on the device.

Accordingly, the present invention provides a polarized manifold connection device having fewer parts and which is smaller and lighter than prior art connection devices. The asymmetrical housing configuration is more readily visually perceptible to users and employs asymmetrically located rigid elements which minimize deformation of the connection housings and the likelihood of forcing the connector halves together in the wrong orientation. The connection device incorporates a releasable locking mechanism which is operable without excessive force to connect the connector halves simply by pushing the halves together and to disconnect the halves simply by pulling the halves apart, without the additional operation of a latch mechanism. The connection device further employs a gasket which also facilitates connection and disconnection of the connector halves while maintaining an air-tight seal.

The invention is not to be limited by what has been particularly shown and described except as indicated by the appended claims.

I claim:

1. A polarized manifold connector for interconnection of a plurality of fluid conduits from a compression sleeve to a plurality of fluid conduits from a source of compressed air, comprising:

a male connector half and a female connector half;

said male connector half comprising:

a male housing having a plurality of fluid ports disposed therein for interconnection with said female connector half, said male housing having a top wall and a bottom wall generally opposed to said top wall and a pair of sidewalls interconnecting said top wall and said bottom wall, each of said sidewalls and said top wall being joined along a rounded outer edge, each of said sidewalls and said bottom wall being joined along a generally sharper outer edge, said sidewalls being angularly disposed to provide a tapered configuration between said top wall and said bottom wall, whereby said male housing has an asymmetrical outer cross-sectional configuration, a first fence having a plurality of fluid ports disposed therein for connection to a first set of the plurality of fluid conduits, and a bulkhead disposed between said male housing and said first fence, a plurality of fluid openings therethrough to interconnect said fluid ports in said male housing and said fluid ports in said first fence;

said female connector half comprising:

a female housing having a plurality of fluid ports disposed therein and having a configuration adapted to mate with said male housing, said female housing having a top wall and a bottom wall generally opposed to said top wall and a pair of sidewalls interconnecting said top wall and said bottom wall, each of said sidewalls and said top wall being joined along a rounded inner edge, each of said sidewalls and said bottom wall being joined along a generally sharper inner edge, said sidewalls being angularly disposed to provide a tapered configuration between said top wall and said bottom wall, whereby said asymmetrical configuration permits a single orientation when said female connector half is mated with said male connector half, a second fence having a plurality of fluid ports disposed therein for connection to a second set of the plurality of fluid conduits, and a bulkhead disposed between said second fence and said female housing, a plurality of fluid openings therethrough to interconnect said fluid ports in said female housing and said fluid ports in said second fence; and a plurality of connections for sealingly interconnecting said fluid ports in said male housing and said fluid ports in said female housing.

2. The polarized manifold connector of claim 1 further comprising means for releasably locking said male connector half and said female connector half together.

3. The polarized manifold connector of claim 2 wherein said releasably locking means comprises an opening disposed in each of said sidewalls of said first female housing and a resilient finger formed in each of said sidewalls of said first male housing, a tab disposed at the end of each of said resilient fingers, said tabs configured to mate within respective ones of said openings in said first female housing.

4. The polarized manifold connector of claim 3 wherein each of said tabs has angled walls to facilitate insertion and removal from said first female housing.

5. The polarized manifold connector of claim 4, further comprising a recess having an angled wall formed in each of said sidewalls of said first female housing adjacent each of said openings to facilitate insertion of said tab into said first female housing.

6. The polarized manifold connector of claim 1 further comprising an opening disposed in each of said sidewalls of said first female housing and a resilient finger formed in each of said sidewalls of said first male housing, a tab disposed at the end of each of said resilient fingers, said tabs configured to mate within respective ones of said openings in said first female housing.

7. The polarized manifold connector of claim 6 wherein each of said tabs has angled walls to facilitate insertion and removal from said first female housing.

8. The polarized manifold connector of claim 7, further comprising a recess having an angled wall formed in each of said sidewalls of said first female housing adjacent each of said openings to facilitate insertion of said tab into said first female housing.

9. The polarized manifold connector of claim 1, further comprising a plurality of recessed keyways formed in the outside of said first male housing, whereby said male connector half is matable with a female connector half having correspondingly located interiorly disposed upraised keys.

10. A male connector of a polarized manifold connection device for interconnection of a plurality of fluid conduits from a compression sleeve to a plurality of fluid conduits from a source of compressed air, said male connector comprising:

a male housing having a plurality of fluid ports disposed therein for interconnection with a corresponding female connector half of the polarized manifold connection device, said male housing having a top wall and a bottom wall generally opposed to said top wall and a pair of sidewalls interconnecting said top wall and said bottom wall, each of said sidewalls and said top wall being joined along a rounded outer edge, each of said sidewalls and said bottom wall being joined along a generally sharper outer edge, said sidewalls being angularly disposed to provide a tapered configuration between said top wall and said bottom wall, whereby said male housing has an asymmetrical outer cross-sectional configuration;

a fence having a plurality of fluid ports disposed therein for connection to a set of the plurality of fluid conduits; and a bulkhead disposed between said male housing and said fence, a plurality of fluid openings therethrough to interconnect said fluid ports in said male housing and said fluid ports in said fence.

11. The polarized manifold connector of claim 10 further comprising a resilient finger formed in each of said sidewalls of said male housing, and a tab disposed at the end of each of said resilient fingers to cooperate with openings on the corresponding female connector half.

12. The polarized manifold connector of claim 11 wherein each of said tabs has angled walls to facilitate insertion and removal from the female connector half.

13. The polarized manifold connector of claim 11 wherein each of said resilient fingers are fully surrounded by each of said respective sidewalls of said male housing.

14. The polarized manifold connector of claim 10, further comprising a plurality of recessed keyways formed in the outside of said male housing, whereby said male connector half is matable with correspondingly located interiorly disposed upraised keys on a female connector half.

15. A polarized manifold connector for interconnection to a plurality of fluid conduits for a compression device, comprising:

a male connector half having a male housing;

a female connector half having a female housing sized to mate with said male housing;

a plurality of first fluid ports on said male connector half for connection to a first set of the plurality of fluid conduits and a plurality of second fluid ports disposed within said male housing and in fluid communication with respective ones of said first fluid ports;

a plurality of third fluid ports on said female connector half for connection to a second set of the plurality of fluid conduits and a plurality of fourth fluid ports disposed within said female housing and in fluid communication with respective ones of said third fluid ports; and a sealing gasket to sealingly interconnect respective ones of said plurality of second fluid ports within said male housing with respective ones of said fourth fluid ports within said female housing when said connector halves are in a mating configuration, said gasket comprising a plurality of fluid conduits, each conduit comprising a first connection portion for overlying one of said plurality of second and fourth fluid ports, and a second connection portion for overlying another of said plurality of second and fourth fluid ports in fluid alignment with said one of said second and fourth fluid ports, said first connection portion having a thinner wall thickness than said second connection portion.

16. The polarized manifold connector of claim 15, further comprising a web member interconnecting each of said plurality of fluid conduits.

17. The polarized manifold connector of claim 15 further comprising a O-ring interiorly disposed within said first connection portion of each of said fluid conduits to seal said one of said plurality of second and fourth fluid ports when said connector members are in a mating configuration.

18. The polarized manifold connector of claim 15 wherein said second portion of each of said plurality of fluid conduits is fixedly attached to a respective one of said another of said second and fourth fluid ports.

\* \* \* \* \*